UNITED STATES PATENT OFFICE.

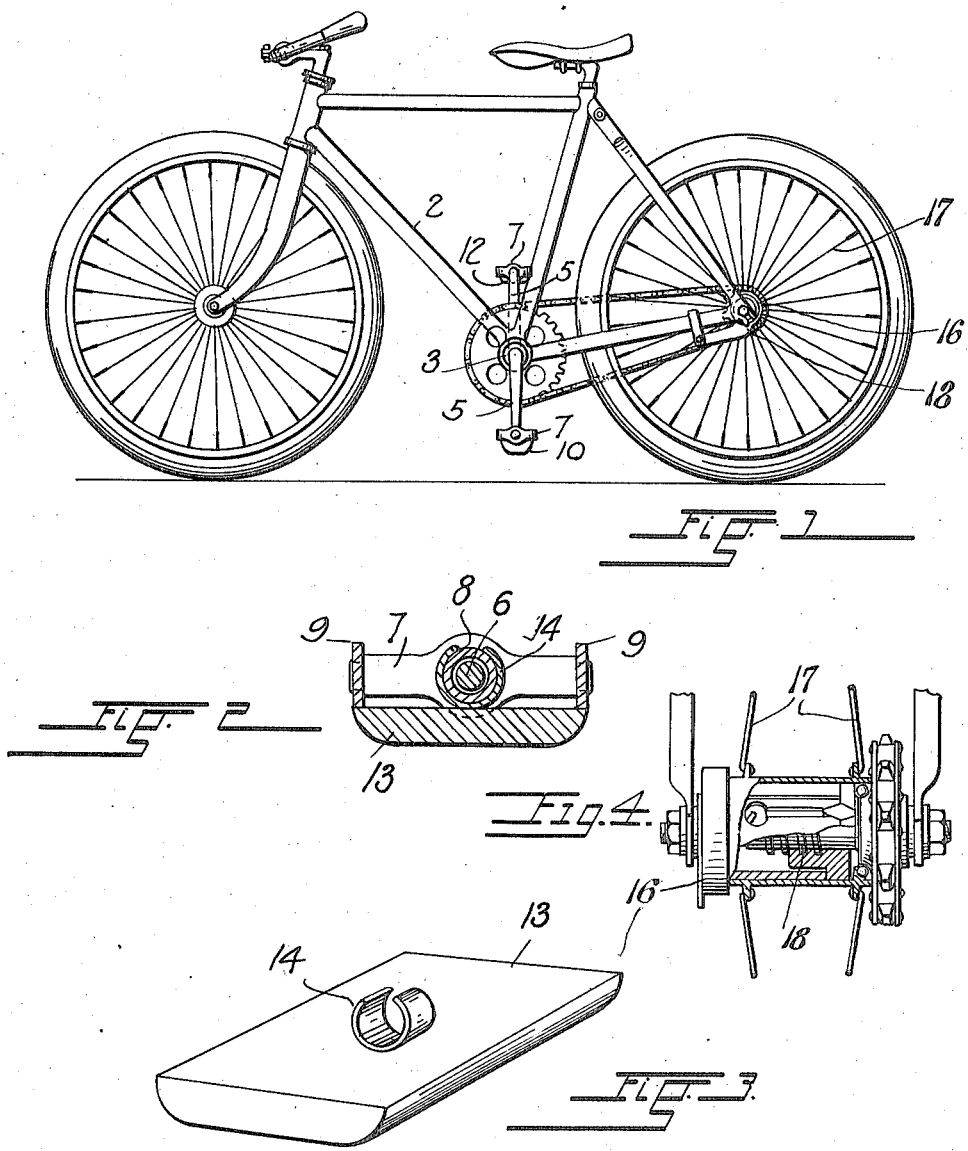

CHESTER D. WRIGHT, OF DENVER, COLORADO.

BICYCLE-PEDAL.

1,393,256.   Specification of Letters Patent.   Patented Oct. 11, 1921.

Application filed August 13, 1919. Serial No. 317,291.

*To all whom it may concern:*

Be it known that I, CHESTER D. WRIGHT, a citizen of the United States, residing at Denver, in the county of Denver and State of Colorado, have invented certain new and useful Improvements in Bicycle-Pedals, of which the following is a specification.

This invention relates to improvements in bicycle pedals and its object resides in the provision of means for automatically adjusting the pedals of a bicycle in the proper position to receive the feet of a rider in mounting the machine.

My invention is particularly adapted for use on bicycles equipped with a so-called coaster brake which permits of a free movement of the driving shaft of the machine when the pedals at the ends of the oppositely extending cranks thereof are not subjected to impellent pressure.

It is well-known that when a bicycle of this type is moved along a road before mounting, the frictional contact of the crank shaft with its bearings will cause it to rotate at intervals and place the pedals in varying positions.

The proper position of the shaft for mounting the bicycle is with its pedal at the side of the machine opposite that at which the rider is positioned, uppermost, and it is this position of the crank shaft that is automatically maintained by the use of my invention.

With the above object in view, my invention consists in placing at the end of one of the pedal cranks of the driving shaft of a bicycle, an overbalancing weight either by providing pedals of different sizes or proportions, or by securing a weight to one of the pedals exclusive of the other, or by attaching to the two pedals unequal weights of suitable form and construction.

It will be readily understood that when the crank-shaft of a bicycle to which my invention is applied, is free to rotate in its bearings, the pedal carrying the greater weight will overbalance the other and by force of gravity move its crank to a downwardly extending position thereby placing the opposite crank with its pedal in the position desirable in mounting the machine.

When the weights are applied beneath the pedals they have the additional advantage of holding the pedals constantly in the proper position to receive the feet of the rider and when the weights are detachably secured to the pedals they can be interchanged to permit of mounting the machine from either side or they may be changed from one side of the pedals to the other to equalize wear of those parts of the pedals with which the feet of the rider come in contact.

The means for attaching the weights to the pedals may vary in accordance with the construction of the same, it being preferred to provide for this purpose a spring-clip adapted to clampingly embrace the central hub of the pedal by which it is mounted upon the pin at the end of its crank.

An embodiment of my invention is shown in the accompanying drawings in the various views of which like parts are similarly designated, and in which—

Figure 1 represents a side elevation of a bicycle of conventional construction to which my invention is applied;

Fig. 2, a transverse section through one of the pedals of the bicycle, drawn to an enlarged scale and showing the application of a detachable weight thereto;

Fig. 3, a still further enlarged, perspective view of the weight, and Fig. 4, a sectional elevation of the hub of the rear wheel of the bicycle and the therewith associated parts of the coaster brake, also drawn to a larger scale.

Referring to the drawings by numerical reference characters 2 designates the frame of a bicycle provided as usual with a bearing 3 for the driving crank shaft.

A coaster brake 18 of conventional construction is applied to the hub 16 of the rear wheel 17 of the bicycle to permit of a free movement of the wheel with relation to the driving mechanism, when the pedals on the crank shaft are not subjected to impellent pressure.

The shaft has at its end oppositely extending cranks 5 provided with outwardly projecting pins 6 upon which the pedals 7 are rotatably mounted.

The pedals may be of any suitable construction and are in their preferred form composed of a central hub 8 between two parallel foot rests 9.

In Fig. 1 of the drawings it is distinctly shown that the pedal on the downwardly extending crank at the near side of the bicycle carries a weight 10 of larger proportions than the weight 12 on the oppositely extending crank at the far side of the same, thereby placing the last-mentioned crank in the proper position to receive the foot of the rider in mounting.

The weights may, as stated hereinbefore, be made a determinate part of the pedals or they may be detachably secured thereto as shown in Figs. 2 and 3 in which the reference character 13 designates the body of the weight, and 14 the spring-clip by which it is attached to the hub of the pedal.

Having thus described my invention what I claim and desire to secure by Letters Patent is:

1. In a bicycle of the character described, the combination of the rotary driving shaft, a coaster transmission between the shaft and the driven wheel, and oppositely extending unequally weighted pedal cranks at the ends of the shaft.

2. In a bicycle of the character described, the combination of the rotary driving shaft, a coaster transmission between the shaft and the driven wheel, oppositely extending cranks at the ends of the shaft, pedals at the ends of the cranks, and weights on said pedals, the weight on the pedal of one of the cranks overbalancing that on the pedal of the other.

In testimony whereof I have affixed my signature.

CHESTER D. WRIGHT.